United States Patent [19]

Isaacson

[11] Patent Number: 4,639,035
[45] Date of Patent: Jan. 27, 1987

[54] REMOVABLE LIGHTWEIGHT ROOF OPENING COVERS FOR VEHICLES

[76] Inventor: Jerry Isaacson, 8504 N. Central Park Ave., Skokie, Ill. 60076

[21] Appl. No.: 551,163

[22] Filed: Nov. 14, 1983

[51] Int. Cl.[4] .............................. B60J 7/10; B60J 7/12; B60J 7/185
[52] U.S. Cl. ..................... 296/218; 296/213; 296/219; 296/224; 160/354; 160/368 R
[58] Field of Search ............... 296/211, 213, 216, 218, 296/219, 224, 136, 201, 202; 160/354, 368 R, 369, DIG. 18; 24/443

[56] References Cited

U.S. PATENT DOCUMENTS

| | | |
|---|---|---|
| D. 205,132 | 6/1966 | Porsche . |
| D. 238,265 | 12/1975 | Stewart . |
| D. 258,427 | 3/1981 | Geraigery et al. . |
| 2,223,477 | 12/1940 | Bernier ................ 160/DIG. 18 |
| 2,556,062 | 6/1948 | Buehrig ..................... 296/218 |
| 2,688,513 | 9/1954 | Poirier ....................... 296/136 |
| 2,787,311 | 1/1956 | Cohen et al. ............... 296/210 |
| 3,046,048 | 6/1962 | Cheney ................... 160/368 S |
| 3,174,794 | 3/1965 | Moynihan .................. 296/219 |
| 3,348,877 | 1/1966 | Caramanna ................. 296/219 |
| 3,464,094 | 9/1969 | Mates ......................... 24/443 |
| 3,476,437 | 6/1966 | Schroeder et al. .......... 296/218 |
| 3,653,711 | 4/1972 | De Claire et al. ........... 296/107 |
| 4,031,942 | 6/1977 | Shelton ................. 160/DIG. 18 |
| 4,104,825 | 8/1978 | Hosmer ...................... 296/218 |
| 4,120,529 | 10/1978 | Chrysler .................... 296/218 |
| 4,121,870 | 10/1978 | Oakey ........................ 296/218 |
| 4,138,155 | 2/1979 | Chrysler .................... 296/218 |
| 4,149,750 | 4/1979 | Thompson et al. .......... 296/218 |
| 4,157,845 | 6/1979 | Queveau ..................... 296/220 |
| 4,220,298 | 9/1980 | Willis .................... 160/DIG. 18 |
| 4,226,052 | 10/1980 | DeStepheno ................ 296/218 |
| 4,290,640 | 9/1981 | Dalton ....................... 296/216 |
| 4,330,150 | 5/1982 | Dunchock et al. .......... 296/218 |
| 4,333,680 | 6/1982 | Wolf et al. ................. 296/216 |

OTHER PUBLICATIONS

J. C. Whitney Catalog, Custom-Fit Rain Top, p. 77, catalog No. 422D, Copyright 1982.

Primary Examiner—Robert B. Reeves
Assistant Examiner—Dennis H. Pedder
Attorney, Agent, or Firm—Welsh & Katz, Ltd.

[57] ABSTRACT

A removable lightweight cover assembly for covering a vehicle roof opening of the type defined by a vehicle roof enclosing three sides of the opening is provided by a generally U-shaped frame releasably latched to the opening and a pliable, lightweight cover releasably attachable to the frame. The frame has latching means for cooperating with fastening means of the vehicle for removably securing the frame to the vehicle roof in substantially leakproof relation, and further has cover attachment means for releasably attaching the cover thereto. The cover assembly is advantageously utilized by latching the frame into the roof opening and selectively attaching the cover to the frame by one or more attachment means whenever it is desired to cover the opening, and storing only the cover in folded or rolled condition in order to substantially uncover the roof opening.

10 Claims, 6 Drawing Figures

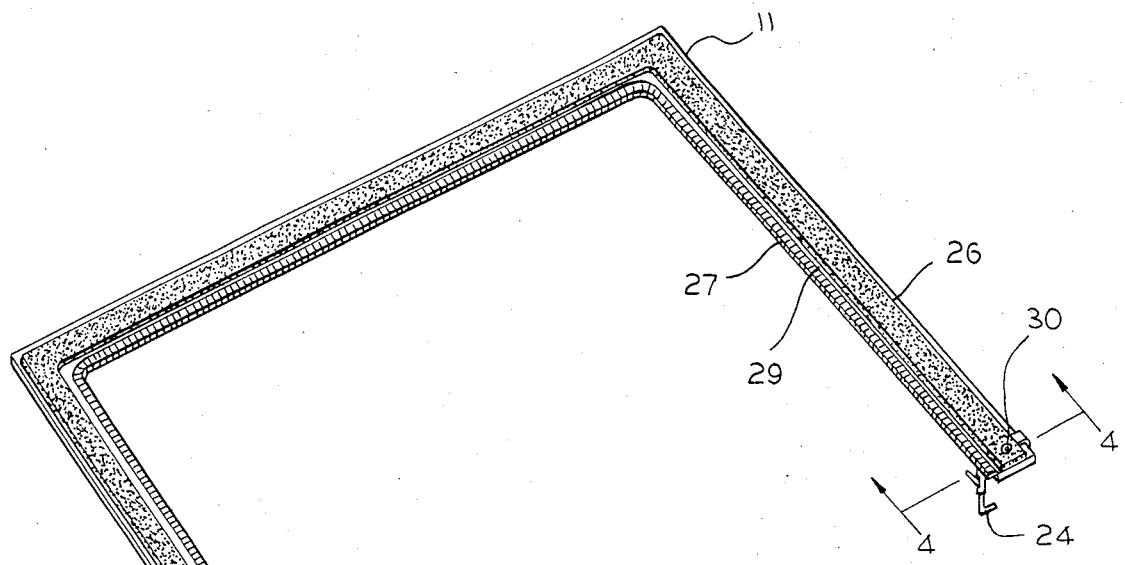
FIG. 3
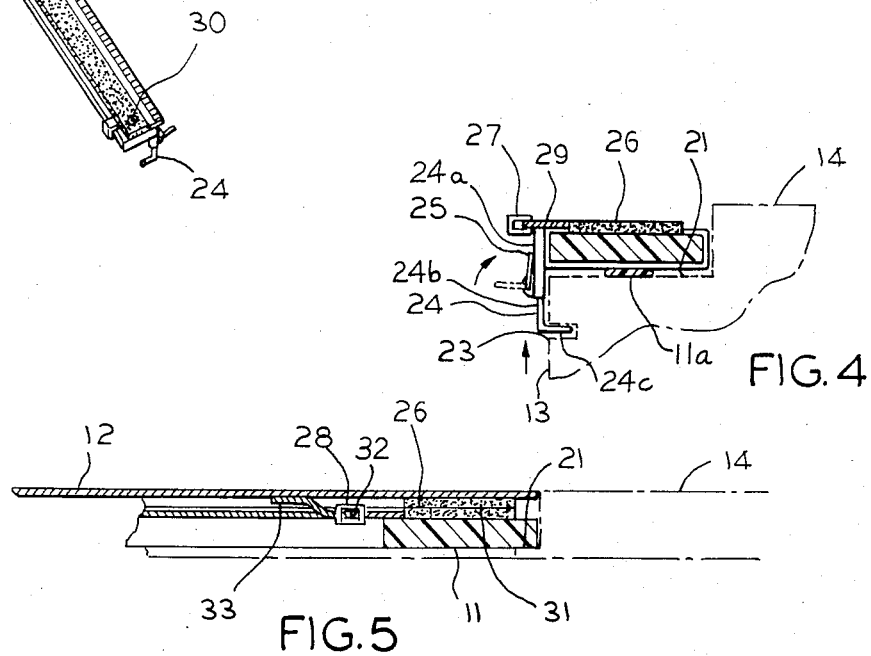
FIG. 4
FIG. 5
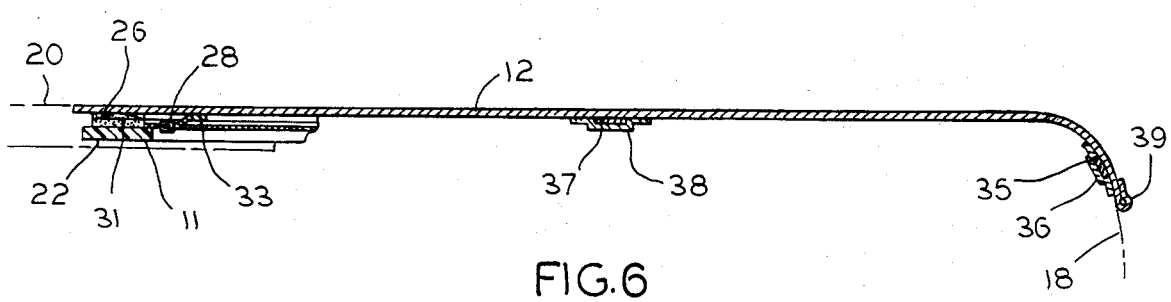
FIG. 6

REMOVABLE LIGHTWEIGHT ROOF OPENING COVERS FOR VEHICLES

FIELD OF THE INVENTION

This invention relates to covers for openings in vehicle roofs and, more particularly, to easily removable and storable lightweight, cover assemblies for vehicle roof openings, such as T-top openings.

BACKGROUND OF THE INVENTION

Vehicles with roof openings removably filled with panels, particularly the roof panel arrangements commonly known as T-tops have become popular during the past several years. In the T-top arrangement, a pair of openings are generally provided in the roof area adjacent opposing side door openings, the roof defining three sides of each roof opening, the fourth side of each being open to the door opening and normally defined by the raised window of the door provided in the door opening. Such vehicles are commonly supplied with roof panels of glass or heavy polymeric material, which can be placed into and across the roof openings. The panels are supported along the three sides of the openings defined by the vehicle roof and are secured thereto by latching devices mounted on the panels and cooperating devices of the roof, generally at or adjacent the openings. While the roof panel and opening arrangement is popular, the panels are relatively heavy and difficult to store in the vehicle, usually in the trunk compartment, due to their bulk and weight, and, if glass, their propensity to crack or shatter upon being sharply struck or bumped. However, the panels must usually be kept with the vehicle when the latter is not garaged, so as to be available for installation as needed to secure the vehicle and to protect the vehicle from the elements. As a result, the vehicle operator is tempted to leave the roof panels out of the openings without storing the panels in the vehicle to avoid frequent handling of the panels and their in-vehicle storage, thus exposing the vehicle interior to the elements and to intruders when the vehicle is unoccupied while parked. Furthermore, as the roof panels are relatively expensive, burglary of vehicles to remove the panels has become an increasingly common problem.

Therefore, it is one object of the present invention to provide a readily removable and easily installable cover assembly for a vehicle roof opening which selectively can be used in place of removable, permanent-type roof panels without altering the roof of the vehicle or devices permanently mounted thereto.

Another object of the present invention is to provide a lightweight, readily removable and installable cover assembly for a vehicle roof opening in which only a foldable or rollable portion need be temporarily removed and stored to provide substantial uncovering of the roof opening.

Still another object of the present invention is the provision of a lightweight cover assembly for a vehicle roof opening which can be readily installed or removed from inside the vehicle, and which forms a weather-resistant enclosure upon completion of the installation.

These and other objects and advantages of the present invention will become readily apparent to those skilled in the art from the following description.

SUMMARY OF THE INVENTION

In general, the objects and purposes of the invention are met by providing a cover assembly comprising a generally U-shaped frame adapted to cooperate with and be supported by the roof panel supporting means of the vehicle roof defining the roof opening, and a cover of pliable lightweight, weather-resistant material adapted to span the frame and extend at least over the marginal edges thereof and which is attachable to the frame to form therewith a substantially water and air resistant cover for the roof opening. The frame of the assembly has latching means for cooperating with and securing the frame to fastening means normally provided in the area of the vehicle roof opening to which the vehicle roof panel is intended to be secured, whereby the frame can be secured in place while being supported by the vehicle roof panel supporting means in substantially leakproof relation. The frame further includes cover attachment means for attaching the pliable, lightweight cover thereto. The cover also has attachment means for cooperating with the attachment means of the frame for selectively attaching the cover to the frame in a substantially water and air resistant relationship.

The cover of the cover assembly is preferably formed of a lightweight, durable, pliable and weather-resistant fabric, such as vinyl fabric, canvas, and the like. The cover, where adapted to span a T-top type opening of a vehicle, preferably is formed with a bead or upturned edge along its marginal edge corresponding to the open side of the frame to act as a rain gutter to reduce or eliminate the dripping or run-off of water from the roof into the door-window opening adjacent the roof opening. The cover assembly in the T-top type opening embodiment described, can serve as a weather seal to the door opening by slightly overlapping the top of the door window in its fully raised position whereby the bead or upturned edge tends to lead water away from the door opening.

The cover assembly of the present invention preferably includes providing the cover with at least one reinforcing member of relatively lightweight, relatively inflexible material preferably extending generally parallel to one edge of the cover. In one form the reinforcing member may be a wire rod or plastic batten provided in an enclosed pocket or sleeve on the underside of the cover. By providing the reinforcing member on the underside of the cover, upon installation of the cover assembly a smooth roof-surface of the vehicle can be maintained improving the air flow and streamlining of the vehicle. Even in the absence of a reinforcing member, by positioning the cover atop the frame and having the frame dimensioned so that it resides on the supporting means of the vehicle roof below the roof surface, a smooth and streamlined roof surface can be maintained upon attachment of the cover to the frame. However, it is preferred to provide at least one reinforcing member to the cover, particularly in the area adjacent the marginal edge of the cover to be positioned adjacent the door opening of a T-top arrangement, so as to maintain a smooth and streamlined roof surface without noticeable sagging of the cover when attached to the frame. It is even more preferred to provide at least two reinforcing members on the underside of the cover so as to provide additional reinforcement of the cover and to inhibit sagging of the cover and flapping or billowing thereof due to the flow of air passing over the roof of the vehicle and into a window or other hatch opening with the cover assembly installed. It is further preferred to have the reinforcing members installed in parallel to each other and to either the marginal edge of the cover intended to be positioned adjacent the door opening, or the marginal edge of the cover opposite thereto, so that the cover can be easily folded or rolled for storage upon removal from the frame.

The cover attachment means of the frame by which the cover is attached to the latter can be any suitable means by which the cover is easily releaseably attached to the frame. A preferred cover attachment means is a strip of adhesive or hook and pile material, such as a strip of hook material commerically available as "VELCRO" (a trademarked product), and hereafter described as "Velcro"-type fastener", attached to the upper surface of the frame engageable with the fabric of the cover overlying the upper surface of the frame upon installation of the cover to the frame. If the material of the cover tends to adhere to the "Velcro"-type fastener strip provided on the frame, then the cover material itself can act as the attachment means of the cover for cooperating with the attachment means of the frame for separably attaching the cover to the frame. However, it is further preferred to provide a strip of mating "Velcro"-type fastener material along the marginal edges of the cover which will overlie the frame so as to provide secure attachment of the cover to the frame. Desirably, the preferred cover attachment means, e.g. the "Velcro"-type fastener material strip, is provided along substantially the total length of the frame so that the cover is attached to all portions of the top of the frame. In this manner a water and air-resistant seal is formed along the three marginal edges of the cover attached to the frame.

Another preferred type of cover attachment means, with which attachment means of the cover is required, is a slide fastener arrangement, such as a zipper arrangement, in which one-half of the track or teeth of the arrangement can be provided on the frame and the other half provided on the underside of the cover. In the use of slide fasteners as the attachment means of the frame and of the cover, one of the tracks or rows of teeth of the slide fastener can be provided along the inner top edge of the U-shaped frame and the other positioned on the underside of the fabric cover to mate therewith starting at or near the end of one of the legs of the frame and terminating at or near the end of the other leg of the frame. The slide of the mechanism can be provided on the cover so it will be unseen when the cover is removed for storage and the frame left in place, while permitting the cover to be installed on the frame from the interior of the vehicle. In addition, it is preferred to utilize additional attachment means, such as mating snap fasteners at the ends of the legs of the frame and the corner portions of the cover overlying the same to secure the corners of the cover to the ends of the legs of the frame to provide a taut, weather-resistant relation therebetween.

In the most preferred arrangement, the cover attachment means of the frame and the attachment means of the cover comprise a pair of the attachment means with portions of the pair provided on the frame and on the cover. Most notably, this latter arrangement can be provided by mating strips of "Velcro"-type fastener material mounted along the top surface of the frame and the underside of the cover overlying that surface, and the slide fastener arrangement heretofore described mounted along the inner, upper marginal edges of the frame and the corresponding undersurface of the cover. Additionally, a pair of snap fasteners can be provided at the described corners of the cover to secure the latter to the ends of the legs of the frame.

The frame of the assembly of the present invention is desirably formed of lightweight metal or metal alloy, and shaped, for example by bending or stamping, to the shape of the roof opening to be covered. Preferable materials for the frame are aluminium and steel alloy. The latching means provided on the frame to cooperate with fastening means provided on the vehicle in the area of the roof opening may vary in design and shape and can generally duplicate or be a modified form of the latching devices provided on the roof panels supplied with the vehicle so as to cooperate with the fastening means. Thus, the details of the design of the latching means are not essential to the present invention and latching devices known to the art can be utilized.

Additionally, the cover of the assembly can include means for providing an alarm or warning signal if an unauthorized attempt is made to remove the cover assembly. Such means can comprise a wire included in or on the underside of the cover, preferably adjacent the unsupported edge of the cover in the T-top opening arrangement, and electrical terminals or contacts mounted on the frame or at the roof opening to provide electrical contact with the wire. The wire and/or contacts can be wired into the vehicle's alarm system or to a separate vehicle alarm system of known configuration, to cause an alarm signal to be broadcast upon the breaking of the wire-contacts circuit.

The operation and construction of the cover assembly of the present invention will be further understood from the following description of the drawings and preferred embodiment.

BRIEF DESCRIPTION OF THE DRAWINGS

In the drawings

FIG. 3 is a perspective view of a frame of a cover assembly of the present invention;

FIG. 4 is an enlarged cross-sectional view taken along line 4—4 in FIG. 3, showing a portion of the roof of the vehicle in broken line, and with the frame being latched to the roof of the vehicle;

FIG. 5 is an enlarged cross-sectional view taken along line 5—5 in FIG. 1 with the roof of the vehicle being shown in broken line; and FIG. 6 is an enlarged cross-sectional view taken along line 6—6 in FIG. 1 with the cover in the attached position.

DESCRIPTION OF A PREFERRED EMBODIMENT

Figure 1:
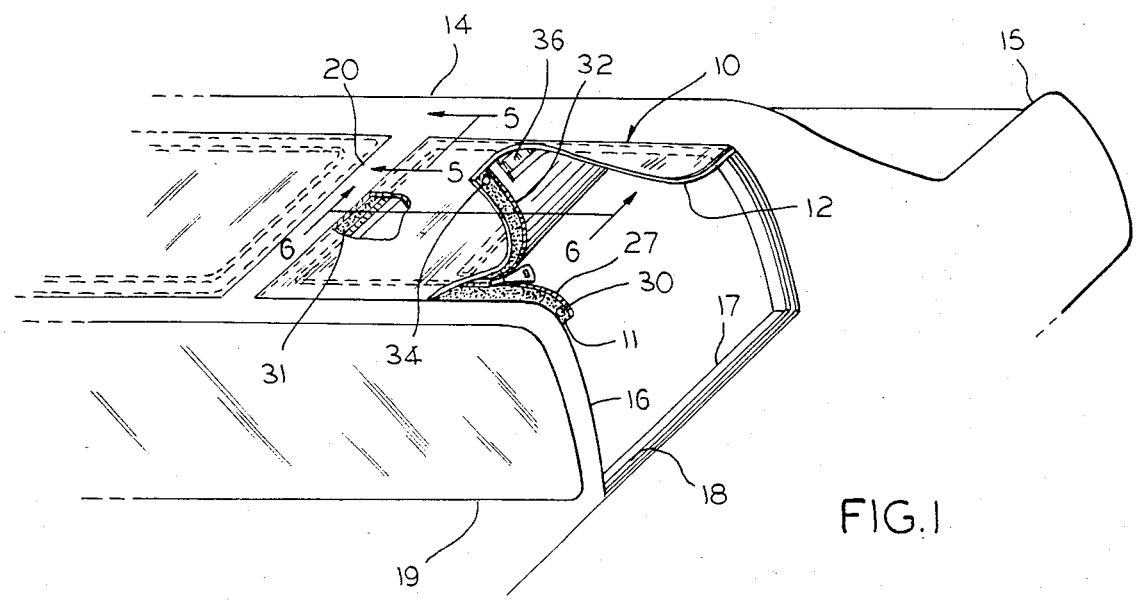
FIG. 1 is a perspective view of a cover assembly in accordance with the present invention with the cover thereof partly unattached and lifted from the frame thereof, and with portions of the vehicle being schematically shown.
Figure 2:
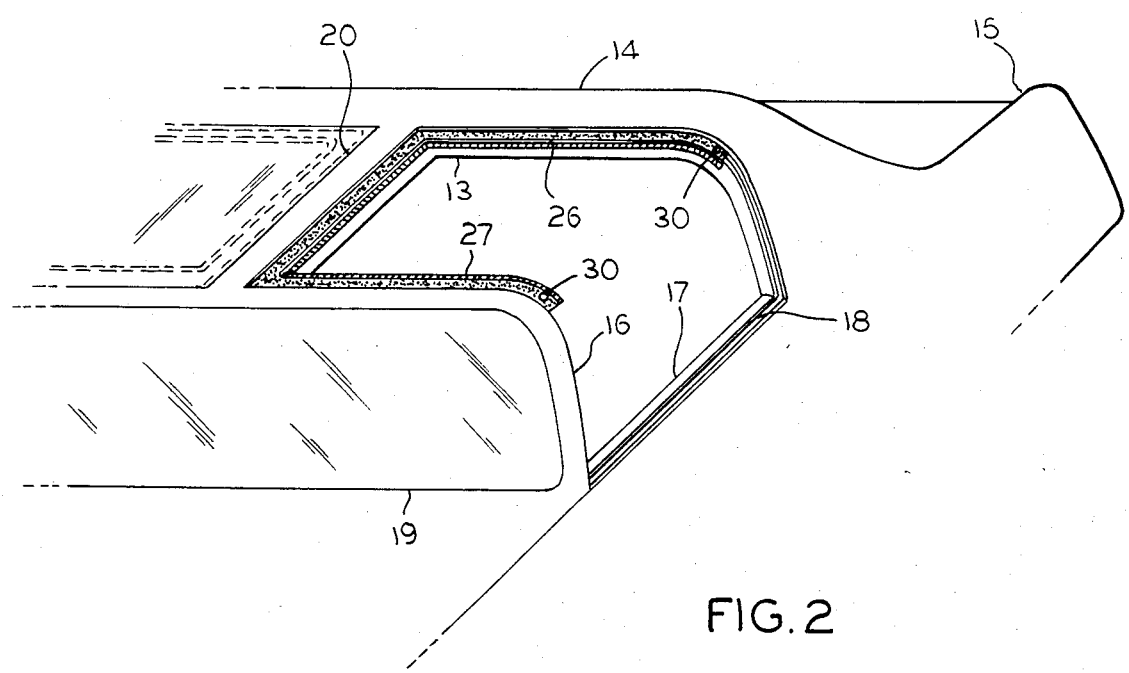
FIG. 2 is a view similar to FIG. 1 with the cover of the assembly having been removed.

Referring to the drawings, the reference numeral 10 generally indicates a cover assembly in accordance with the present invention. Assembly 10 includes a generally U-shaped frame 11 and a cover 12 of pliable, lightweight, weather-resistant material. Assembly 10 is intended for use in covering a vehicle roof opening 13 defined by the roof 14 of a vehicle body 15. In the embodiment shown in the drawings, roof 14 generally defines a T-top opening which extends into the door opening 16 which is enclosed at its lower portion by a door 17 and the upper portion of opening 16 can be closed by raising a window 18 (as shown in broken line in FIG. 6). In the embodiment shown in the drawings, the opening 13 of the T-top type is formed by a forward roof portion adjacent the windshield 19 of body 15, a rearwardly extending center bar or T-bar 20 and a rearward portion of roof 14. The opening thus defined is generally U-shaped and commonly is paired with another opening, which is the mirror image of opening 13 and extends into a door opening on the opposite side of vehicle body 15. It should be understood that the size and position, i.e. forwardly or rearwardly, of the opening 13 in the vehicle roof will vary with each model of vehicle. It is contemplated that the assembly of the present invention can be readily designed and dimensioned to be utilized with the various models of vehicles having roof openings.

As best shown in FIG. 4, opening 13 defined by vehicle roof 14 is formed with a supporting track or ledge 21 which acts as means for supporting the roof panel (not shown) normally supplied with the vehicle. The roof panels are commonly heavy, and usually of glass, and therefore require a substantial ledge about the edge of the opening for supporting the panel. Ledge 21 is recessed beneath the surface of roof 14 a distance sufficient to permit the upper surface of the panel to lie flush with the roof surface to provide a smooth roof surface for streamlining and esthetic design. A weather seal strip 11a may be present along ledge 21 to provide a weather-resistant seal upon installation of the panel. The center or T-bar 20 in addition, or in place of ledge 21 may include a grooved recess or channel 22 (FIG. 6), and/or one or more slots (not shown) into which corresponding portions, such as a lip or flange or flanges of the panel, are inserted to secure the panel to the T-bar 20.

The vehicle body 15, and particularly the roof 14 thereof, commonly includes fastening means at or adjacent the opening 13 for securing the roof panel in the roof opening for security and to form a weather-resistant relation between panel and roof. In the embodiment shown in the drawings the fastening means of the vehicle body is illustrated by aperture 23 (FIG. 4) formed in a reinforced portion of the roof 14. Commonly, at least one other aperture in the portion of the roof defining the opposite side of opening 13 is provided. The roof panel supplied with the vehicle generally has latching means for cooperating with the fastening means of the vehicle which commonly varies in design with the particular manufacture and/or model of the vehicle.

It is contemplated that latching means of the same type and general design as provided on the roof panels supplied with the vehicle can be utilized by mounting such means on the frame of the assembly of the present invention. Alternatively, simplified latching means, such as spring latch or toggle clip 24 (FIG. 4) can be mounted on frame 11, for example to its inner surface or side, positioned so as to cooperate with the fastening means, such as aperture 23 as shown. Spring latch or toggle clip 24 is also illustrated in FIG. 3, wherein frame 11 is illustrated as having straight ends for the purpose of clarity of illustration, although it is understood that the ends of the frame will be bent or shaped to conform to the configuration of the opening 13 of the vehicle roof 14. Spring latch or toggle clip 24 can be of any desired design known to the art, and may resemble the toggle-type latch commonly utilized for latches on footlockers and the like. Latch 24 generally comprises a barrel 24a with a pin 24b extending therefrom in telescoping fashion with an angled portion 24c for insertion into aperture 23. A toggle 25 is provided so that upon actuation of the toggle the pin 24b is forced upwardly within aperture 23 to clamp frame 11 against ledge 21 and against any sealing strip which may be present therebetween. Additional latches or clips 24 can be provided on frame 11 if the vehicle roof opening 13 provides fastening means, such as additional apertures 23, with which latches or clips 24 can be utilized.

Frame 11 further includes a strip 26 of "Velcro"-type fastener material adhesively affixed to the upper surface of the frame. Strip 26 covers a substantial portion of the upper surface of frame 11, and particularly is substantially coextensive with the length of frame 11. Strip 26 serves as cover attachment means by which cover 12 can be attached to frame 11 as will be hereinafter described. Frame 11 further includes one track or row of teeth 27 of a slide fastener, generally designated as 28. Teeth 27 in connection with the slide fastener 28 serve as second cover attachment means as will be hereinafter described. Teeth 27 can readily be mounted to frame 11, preferably extending inwardly of the inner edge of frame 11 by adhesively mounting a fabric strip 29 supporting teeth 27 in the desired position, in the manner generally known to the slide fastener art. Frame 11 further includes one-half of each of a pair of snap fasteners 30 adjacent the ends of frame 11, preferably mounted in and attached to strip 26 which will serve as third cover attachment means in a manner hereinafter described.

Cover 12 is dimensioned to span frame 11 and extend substantially to the upper edges of opening 13, as best shown in FIGS. 1, 5 and 6. As illustrated in these figures, cover 12 upon attachment to frame 11 and installation of the assembly 10 in the opening 13 forms a smooth roof surface with roof 14.

Cover 12 on its underside is provided with strip 31 of a "Velco"-type fastener mating material so as to attachably cooperate with strip 26 of frame 11. Strip 31 is positioned along three marginal edge portions of cover 12 so as to substantially coextend with strip 26 of frame 11. Cover 12 is further provided with a track or teeth 32 of the slide fastener 28, which teeth are desireably secured to the fabric of cover 12 adhesively or by sewing of a supporting fabric strip 33, in a manner known to the slide fastener art. Cover 12 also includes the other half 34 of snap fasteners 30, only one of which is shown in FIG. 1, by which the corner portions of cover 12 adjacent door opening 16 can be secured to frame 11. Strip 31, teeth 32 and snap fastener halves 34 comprise first, second and third attachment means, respectively, of the cover for attaching cover 12 to frame 11.

Cover 12 additionally includes a reinforcing member 35 of relatively lightweight, material which is relatively inflexible as compared to the fabric of the cover. Member 35 in the embodiment shown is a polymeric batten or strip provided in an enclosed pocket or sleeve 36 on the underside of the cover. Sleeve 36 can be formed by securing a panel of fabric to cover 12 with an adhesive or by sewing the former to the latter. Reinforcing member 35 serves to stiffen cover 12, particularly along its marginal portion adjacent door opening 16 to prevent sagging and to maintain a smooth and streamlined roof surface. Cover 12 further includes a second reinforcing member 37 positioned in a sleeve 38 provided in the same manner as sleeve 36. Member 37 provides additional reinforcement of cover 12 to inhibit sagging and flapping or billowing thereof due to the flow of air passing over the roof of the vehicle and into a window opening or other opening of the passenger compartment of the vehicle. Reinforcing member 35 is positioned substantially parallel to the edge of cover 12 adjacent the door opening 16 and generally in line with the flow of air of the moving vehicle. Member 37 is positioned substantially in parallel with member 35 for ease in rolling cover 12 for storage.

Cover 12 is provided with an upturned edge or bead 39 along its marginal edge corresponding to the open side of the frame adjacent door opening 16. Upturned edge or bead 39 serves as a gutter to reduce or eliminate the dripping or run-off of water from cover 12 and roof 14 into the door opening 16.

The cover assembly 10 can be selectively installed in opening 13 by placing frame 11 into the opening by inserting the central leg of frame 11 into grooved recess 22 of T-bar 20 and resting the remaining two legs of frame 11 upon ledge 21. Thereafter, the pin portions of spring latches or toggle clips 24 are inserted into apertures 23, and the respective toggles 25 of the latches or clips 24 rotated to cause the latches or clips to clamp frame 11 to the ledge 21. In this manner, frame 11 has been installed and secured to the roof of the vehicle, while opening 13 therein is substantially open. The vehicle may now be operated while achieving the desired advantage of having an open roof portion. Frame 11 need not be removed from roof 14, unless it is desired to replace frame 11 or cover assembly 10 with the roof panel supplied with the vehicle.

Whenever it is desired to cover opening 13, with frame 11 in place, cover 12 can be readily attached to frame 11. The installation of cover 12 can even be performed substantially from the interior of the vehicle, if desired. To attach cover 12, the corner thereof including the slide of slide fastener 28 is positioned so that the slide and the end of teeth 32 engage the end of the row of teeth 27 of the slide fastener. The slide of slide fastener 28 is then progressively advanced about the interior of frame 11 until the slide of slide fastener 28 has completed its travel to the opposite end of frame 11. At this point cover 12 has been substantially attached and secured to frame 11. If installation from the interior of the vehicle is desired, halves 34 of the cover may next be secured to snap fasteners 30 to secure the corner portions of cover 12 to the end portions of frame 11. However, if complete attachment of cover 12 to frame 11 is desired, then strip 31 of cover 12 can be pressed against strip 26 of frame 11 to fasten the marginal edges of cover 12 thereto, and thereafter halves 34 can be fastened to snap fasteners 30. Alternatively, cover 12 can be attached to frame 11 by securing only the strip 31 to strip 26 for rapid, temporary installation of the cover. Attachment of cover 12 to frame 11 in the manner described above will provide a lightweight cover to the roof opening while forming a weather-resistant seal about the three sides of the opening defined by the roof of the vehicle.

As shown in the drawings, the edge of cover 12 upon attachment to frame 11 is designed to slightly overlap window 18 when the latter is in the fully raised position. As generally shown in FIG. 6, the marginal edge of cover 12, reinforced by member 35 and bead 39 serves as a weather-seal to the door opening with the bead directing water away from the door opening.

While only one preferred embodiment of the present invention has been described, it should be understood by those skilled in the art that various changes coming within the spirit of the invention may be suggested thereby. For example, various latching mechanisms provided on roof panels of different manufacturers and models of vehicles will dictate and suggest various latching means by which the cover assembly of the present invention can be installed to cover roof openings in such vehicles. Hence, the invention is not limited to the specific embodiments shown or described and uses mentioned, but the same is intended to be merely exemplary, the scope of the invention being limited only by the appended claims.

I claim:

1. A removable, lightweight cover assembly for covering a vehicle roof opening of the type defined by a vehicle roof, the vehicle roof enclosing the opening on three sides and providing roof panel supporting means about the opening for supporting a vehicle roof panel and fastening means for securing the vehicle roof panel thereto, comprising:

a generally U-shaped frame adapted to cooperate with and be supported by and to be removably secured to the roof panel supporting means of the vehicle roof, said frame also enclosing on three sides said roof opening, said roof opening thus enclosed being continuous on a fourth side with a door opening, said frame having latching means for cooperating with the fastening means of the vehicle roof for removably securing said frame to the vehicle roof in substantially leakproof relation, said frame further having cover attachment means for removably attaching a pliable, lightweight cover thereto, and a cover of pliable, lightweight, weather-resistant material adapted to span said frame and extend at least to marginal edges thereof, said cover having attachment means for cooperating with said cover attachment means of said frame for separably attaching said cover to said frame in substantially water and air resistant relation.

2. The cover assembly of claim 1 wherein said cover attachment means of said frame and said attachment means of said cover are substantially coextensive with each other and the marginal edges of said frame.

3. The cover assembly of claim 2, wherein said cover attachment means of said frame comprises a "Velcro"-type fastener material extending along the marginal edges of said frame.

4. The cover assembly of claim 2, wherein said cover attachment means of said frame and said attachment means of said cover together comprise slide fastening means for removably attaching said cover to said frame.

5. The cover aasembly of claim 2, wherein said cover attachment means of said frame and said attachment means of said cover comprise a plurality of mating pairs of attachment means for attaching said cover to said frame, one member of each of said pairs of attachment means being provided on said frame and the other member of each of said pairs being provided on said cover.

6. The cover assembly of claim 5, wherein said pair of attachment means comprise a slide fastener arrangement and at least one strip of a "Velcro"-type fastener material extending along the marginal edges of the upper surface of said frame and a strip matable therewith extending along the marginal edge portions of said cover overlying said frame.

7. The cover assembly of claim 5, wherein said plurality of pairs include a pair of attachment means adjacent at least one end of said frame and a corner portion of said cover for releasably attaching said corner portion of the cover to said end portion of the frame.

8. The cover assembly of claim 1, wherein said cover includes at least one reinforcing member extending generally parallel to one edge of said cover.

9. The cover assembly of claim 8, wherein said cover includes at least two reinforcing members positioned on the underside of said cover, said reinforcing members being positioned substantially parallel to each other.

10. The cover assembly of claim 1, wherein said cover includes gutter means positioned along a marginal edge for directing water therealong, whereby water reaching said cover is inhibited from dripping from the said marginal edge of the cover.

* * * * *